April 8, 1941.  E. O. ROGGENSTEIN  2,237,868
ELECTRIC MOTOR
Filed July 13, 1938     2 Sheets-Sheet 1

INVENTOR
EDWIN O. ROGGENSTEIN
BY *W. A. Sparks*
ATTORNEY

April 8, 1941.  E. O. ROGGENSTEIN  2,237,868

ELECTRIC MOTOR

Filed July 13, 1938  2 Sheets-Sheet 2

INVENTOR
EDWIN O. ROGGENSTEIN

BY *H. A. Sparks*
ATTORNEY

Patented Apr. 8, 1941

2,237,868

UNITED STATES PATENT OFFICE 2,237,868

ELECTRIC MOTOR

Edwin O. Roggenstein, Ilion, N. Y., assignor to Remington Rand Inc., Buffalo, N. Y., a corporation of Delaware Application July 13, 1938, Serial No. 218,998

3 Claims. (Cl. 172—279)

This invention relates to alternating current motors, and more particularly to constructive features of such motors which improve their starting characteristics, and permit the delivery of considerable power at synchronous speed.

Synchronous motors of the salient pole type with rotors having low resistance windings have been known for some time, but their use has been restricted because of the difficulty in starting them. Motors of this type have been used, but their design has always been a compromise between the starting and running characteristics.

The fundamental feature of the invention, hereinafter to be described in detail, consists of a starting circuit employing a pair of contacts in series with the power supply to interrupt the current in phase with the angular position of the rotor. After the rotor has attained a synchronous speed, a centrifugal device disables a cam operated interrupter mechanism, permitting the contacts to close and remain closed until the speed again falls below synchronism.

The principal object of this invention is to provide a motor which will have maximum power at synchronous speed.

Another object is to provide a motor which has a high starting torque.

Still another object is to provide a motor with a salient pole rotor containing short circuited turns thereon which will easily maintain synchronous speed with a minimum of hunting.

Another object is to provide a motor for an electric razor which is quiet while running, and produces no radio interference.

Other objects and structural details of the invention will be apparent from the following description when read in connection with the accompanying drawings, wherein Fig. 1 is a front elevational view of an electric razor, the cover having been removed to disclose the invention;

Figure 1:
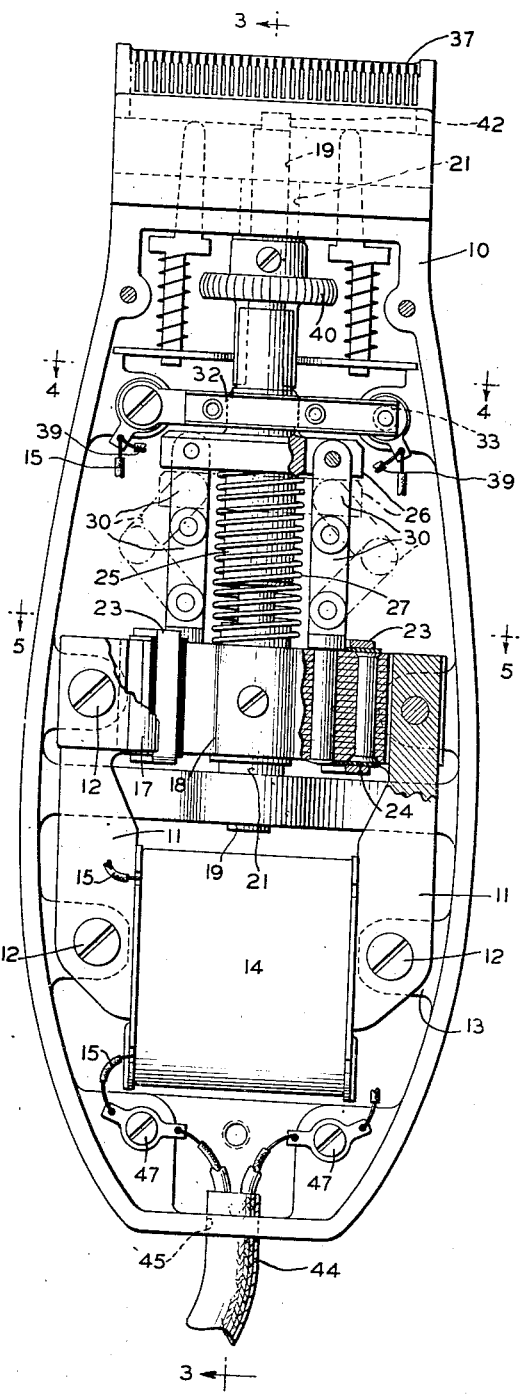
Figure 2:
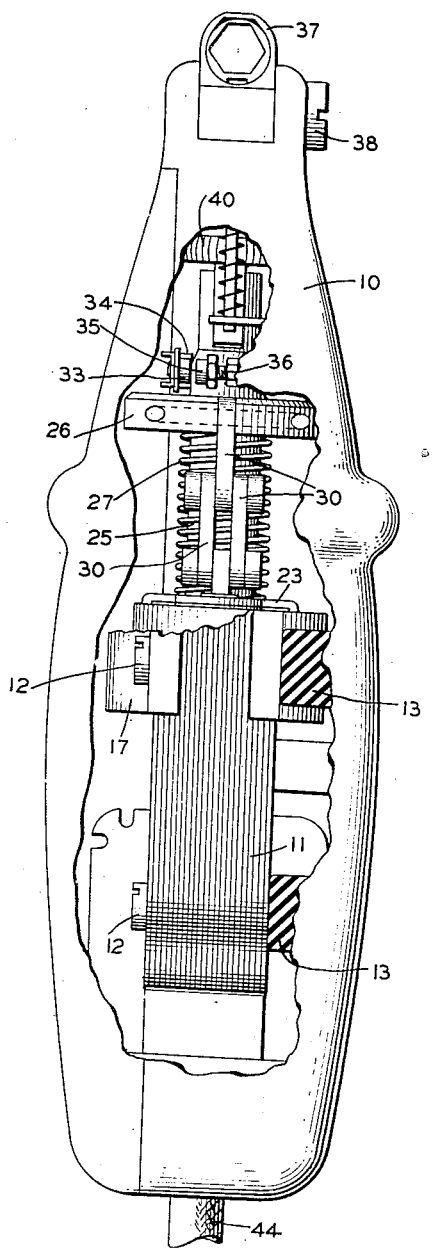
Fig. 2 is a side view of the razor with parts of the casing broken away to show the position of the motor parts therein.
Figure 4:
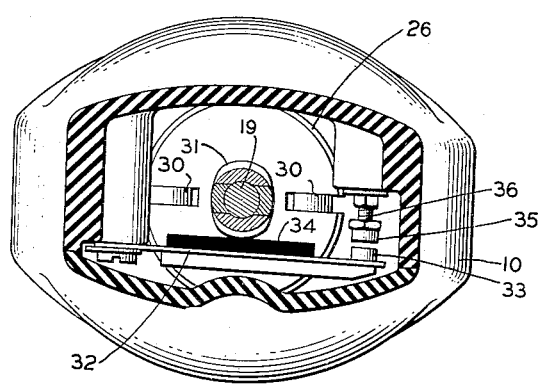
Fig. 4 is a cross section taken along 4—4 of Fig. 1.

Referring now to the drawings in detail, a case 10 composed of any suitable insulating material such as Bakelite, serves as the supporting means to hold the motor parts in their proper alignment. A laminated iron core 11 is secured by screws 12 to webs 13 formed in the insulated case. About the central portion of this core, a field winding 14 is positioned, having connecting lead wires 15.

The extremities of the laminated core 11 are machined to give them an arcuate face 16, and retaining iron flanges 17 are secured to each side of said extremities to provide a wider area over which the magnetic flux can be effective. The end portions of the core with attached flanges form two field poles, which cause an alternating magnetic flux to traverse the intervening space when the winding 14 is supplied with alternating current.

Figure 3:
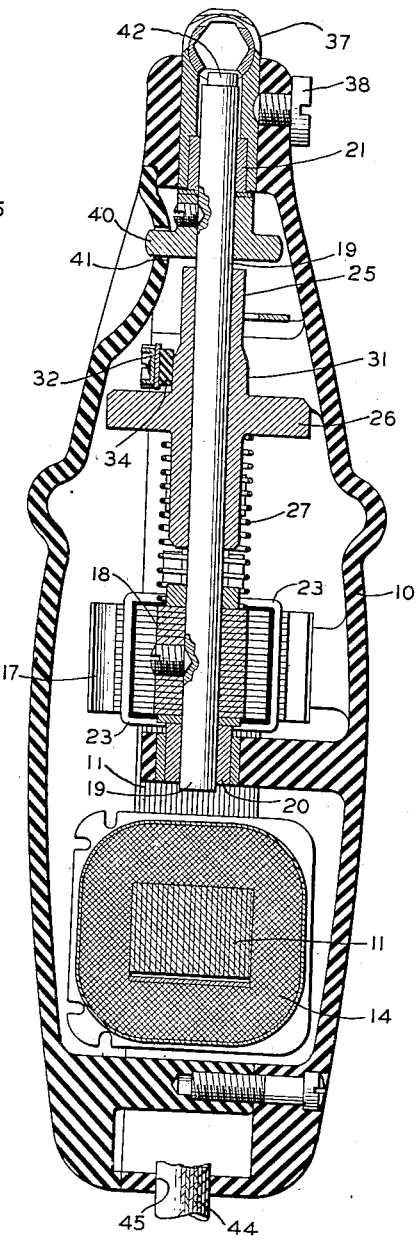
Fig. 3 is a longitudinal section taken along 3—3 of Fig. 1.

Centrally mounted between the poles is a laminated iron rotor 18 (Fig. 3) mounted on a shaft 19 which is journaled at both ends in bearings 20 and 21.

The rotor 18 has two poles, oppositely spaced on the shaft 19 with cut out portions between, thus making it a salient pole type of rotor. The faces 22 of the rotor are ground so that they will revolve close to the pole piece faces 16, maintaining a constant spacing between them. About each rotor pole is placed a copper strap 23 insulated from the iron laminations by a fiber insulator 24. This copper strap forms a short circuited secondary winding, receiving its current by induction from the field coil 14 as is well known.

Also mounted on the shaft 19 is a sleeve 25 which is free to move longitudinally along the shaft within certain limits. Formed on the middle portion of the sleeve 25 is a disc 26 which is engaged by a spring 27 tending to force the disc and sleeve away from the armature 18. The spring action is restrained by a set of links 30 which yieldably connect the disc 26 with the armature 18, being attached at their ends by suitable pins and eyebolts.

Formed on the disc 26 on the side away from the rotor is a cam 31, having diametrically opposed cam faces. Cooperating with the cam faces is a make and break contact assembly which consists of a spring member 32 secured at one end to the case and carrying a contact point 33 on the other. A flat piece of insulating material 34, such as Bakelite, is secured to the middle portion of the spring 32 and is forced into contact with the cam face 31. A second contact point 35 is secured to a web of the case 10, and mounted on an adjustable screw 36. The spacing between the contacts 33, 35 is made such that they will be separated when a cam face 31 is in contact with the insulating piece 34, and in contact when the shaft 19 has turned through a quarter revolution.

Since the cam faces are spaced 90° from the pole pieces of the rotor, and the contact spring is set in line with the field poles, it will be obvious that the contacts are open when the rotor poles are adjacent to the field poles, and closed when the rotor poles are between the fields.

At the uppermost end of the shaft 19 a shearing head 37 is positioned, clamped by a screw 38 in a channeled recess in the insulated case. The exact method of mounting the head and the design of said head do not affect the novelty of the present invention. Directly below the bearing 21, and concentrically mounted on shaft 19, is a knurled wheel 40, part of which extends through a slot 41 in the case, so that it may be turned manually in case the motor does not start, when first switched on. Means for oscillating the movable portion of the shearing head 37 is contained in an eccentric 42 formed on the end of shaft 19, and a coacting slot in the base of the movable inner cutter.

Figure 6:
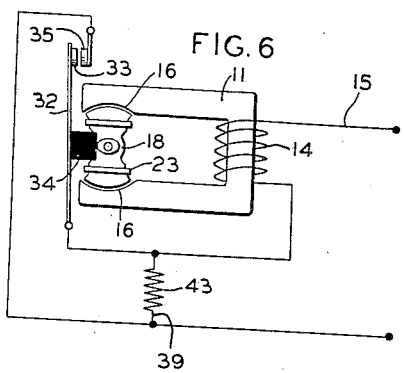
Fig. 6 is a schematic wiring diagram of connections of the motor when in its starting position.

A small resistance unit 43 (Fig. 6) is connected by wires 39 across the contact points 33, 35 as indicated in the schematic diagram of connections. This resistance decreases the sparking at the contacts but its main function is to provide better speed regulation for the motor prior to synchronism. A conventional cord 44 is used to supply power to the motor elements and enters the case 19 by way of the hole 45, and is connected to the terminals 47.

The operation of the motor is as follows: When the current is switched on the rotor may be in such a position as to keep the contacts 33, 35 separated. If such is the case, no action will result until the shaft is rotated manually to bring the contacts together. As soon as the contacts close, current flows through the field coil 14 creating a magnetic field between the two pole pieces 11. This attracts the rotor which, because of the angular position of the cam 31 on the shaft, always has its poles displaced from the field poles when the starting current is flowing. The angular motion of the rotor continues under the magnetic attraction of the field pole pieces until the rotor poles and the field poles are approximately opposite each other. At this point the cam opens the contacts, reducing the flow of current and greatly lowering the attractive force acting on the rotor. Due to the resistance 43, a small amount of current still flows through the field coils when the contacts 33, 35 are open. Therefore, the armature has to pull out of a weak magnetic field as its inertia carries it around another quarter revolution until the contacts again close and the field coil and the rotor poles are again in a position to cause progressive rotation. The forces acting on the rotor are such that only a few revolutions are necessary to accelerate the rotor speed to a value close to 3,600 revolutions per minute. Just before the rotor reaches this speed, the centrifugal force acting on the link members 30 will pull the hinged portions away from the shaft as indicated by the dot and dash lines in Fig. 1. This action will pull the disc 26 and the sleeve 25 downwardly against the action of the spring 27, and at the same time lower the cam 31 out of engagement with the spring contacts. As long as the cam remains in its lowered position, the contacts will remain closed and current will be supplied to the field coil 14 continuously, and an alternating magnetic flux will always be present in the space between the field poles. The inductive action of this flux traversing the rotor core sets up a current in the short circuited windings 23, and the magnetic flux set up by this current results in a countermagnetomotive force which adds considerably to the rotor power of rotation, and holds the speed in step with the power supply alternations. The motor is now acting as a synchronous induction motor of the salient pole type, which action is well known to the art.

The retention of a small current in the field coils, when the contacts are open, results in a definite braking action on the rotor and prevents excessive no load speed. This braking action may be varied by adjusting the value of the resistor 43. In the present design 150 ohms is used which allows a maximum speed of about 3,600 R. P. M. and insures prompt synchronization. If the resistor be omitted and the armature allowed to rotate freely when passing the field poles, the no load speed will be greatly in excess of that required for synchronism and a delicate adjustment of the centrifugal mechanism will be necessary.

It will be evident from the above that the motor is started as a vibration motor and brought up to speed, and upon nearing synchronous speed it is transformed into a synchronous induction motor.

One of the advantages of such an arrangement is that the salient pole rotor may be designed for synchronous speed without any compromises to effect good starting characteristics.

Figure 5:
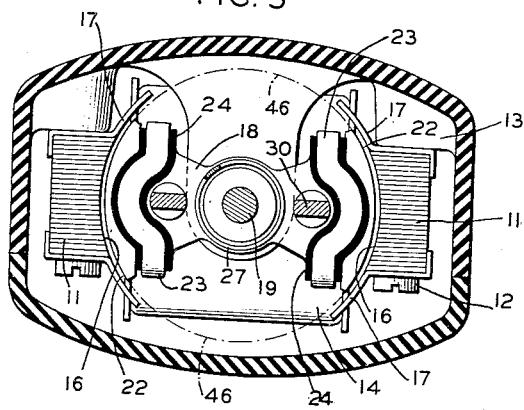
Fig. 5 is a cross section taken along 5—5 of Fig. 1.

Squirrel cage induction motors employ rotors which occupy the entire cylindrical volume indicated by the dot and dash line 46 in Fig. 5. The present design has a large part of this volume cut away to form salient poles and produce a large reluctance to magnetic flux when the rotor poles are not adjacent the field poles.

The result of this reluctance is that a torque will be developed which will tend to cause the rotor to assume the minimum reluctance position, as shown in Fig. 5, for each positive and negative alternation of the supply current. From this it is obvious that the machine may be loaded without any appreciable danger of the rotor falling out of step with the rotating field, and can be loaded to a considerably greater extent than could a machine without the combined features of short circuited rotor turns and wide air spaces between rotor poles.

It is to be understood that the present invention is not limited to single phase motors, and is not dependent on having the secondary the rotating member. The illustrations are shown in connection with a two pole motor, but will be obvious to those skilled in the art that the invention is not limited to a motor of any definite pole number.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent is:

1. A synchronous induction motor forming a driving element for the shearing head of a dry shaver device comprising, in combination, an electromagnetic flux producing field member having opposed poles, a bi-poled rotor situated between said field poles mounted on a shaft, a short circuited winding located about each rotor pole, a non-circular sleeve resiliently positioned to move longitudinally, within predetermined limits, on said shaft while rotating with the same, a pair of contacts adapted to be intermittently made and broken by the camming action of said non-circular sleeve when the motor is started, said contacts being arranged in a parallel circuit with a resistance element, both of which are connected in series with the winding of the electromagnetic flux producing field member, and centrifugal means for closing said contacts to obtain a continuous flow of electrical energy through the winding of the field member at synchronous speed of the motor, said means comprising one or more joined links yieldably connecting the rotor and said sleeve and being adapted to remove said sleeve from camming engagement with the contacts as the motor approaches synchronous speed.

2. A synchronous induction motor forming a driving element for the shearing head of a dry shaver device comprising, in combination, an electromagnetic flux producing field member having opposed poles, a bi-poled rotor situated between said field poles mounted on a shaft, a non-circular sleeve resiliently positioned to move longitudinally, within predetermined limits, on said shaft while rotating with the same, a pair of contacts adapted to be intermittently made and broken by the camming action of said non-circular sleeve when the motor is started, there being a braking action each time the respective poles of the rotor and field member move into approximate alignment, said contacts being arranged in a parallel circuit with a resistance element, both of which are connected in series with the winding of the electromagnetic flux producing field member, and centrifugal means for closing said contacts to obtain a continuous flow of electrical energy through the winding of the field member at synchronous speed of the motor, said means comprising one or more joined links yieldably connecting the rotor and said sleeve and being adapted to remove said sleeve from camming engagement with the contacts as the motor approaches synchronous speed.

3. A synchronous induction motor forming a driving element for the shearing head of a dry shaver device comprising, in combination, an electromagnetic flux producing field member having opposed poles, a rotor situated between said field poles mounted on a shaft, a non-circular sleeve resiliently positioned to move longitudinally, within predetermined limits, on said shaft while rotating with the same, a pair of contacts adapted to be intermittently made and broken by the camming action of said non-circular sleeve when the motor is started, said contacts being arranged in a parallel circuit with a resistance element, both of which are connected in series with the winding of the electromagnetic flux producing field member, and centrifugal means for closing said contacts to obtain a continuous flow of electrical energy through the winding of the field member at synchronous speed of the motor, said means comprising one or more joined links yieldably connecting the rotor and said sleeve and being adapted to remove said sleeve from camming engagement with the contacts as the motor approaches synchronous speed.

EDWIN O. ROGGENSTEIN.